United States Patent [19]

Kantor

[11] Patent Number: 4,508,374

[45] Date of Patent: Apr. 2, 1985

[54] TUBE CONNECTION FITTINGS

[75] Inventor: Itzhak Kantor, Menashe, Israel

[73] Assignee: Plasson Maagan Michael Industries Ltd., Menashe, Israel

[21] Appl. No.: 431,013

[22] Filed: Sep. 30, 1982

[30] Foreign Application Priority Data

Nov. 26, 1981 [IL] Israel ................................. 64379

[51] Int. Cl.³ ............................................. F16L 19/00
[52] U.S. Cl. .................................... 285/319; 285/331; 285/343; 285/423
[58] Field of Search ............... 285/319, 331, 249, 423, 285/343

[56] References Cited

U.S. PATENT DOCUMENTS

| 791,905 | 6/1905 | Higginbotham | 285/249 |
| 2,755,110 | 7/1956 | Jacobs | 285/423 X |
| 2,768,845 | 10/1956 | Samiran | 285/331 |
| 3,218,094 | 11/1965 | Bauer | 285/331 X |
| 3,454,290 | 7/1969 | Tairraz | 285/249 |
| 3,565,467 | 2/1971 | Haldopoulos et al. | 285/319 X |
| 3,977,708 | 8/1976 | Jopp | 285/423 X |
| 4,293,149 | 10/1981 | Bonel | 285/319 X |

FOREIGN PATENT DOCUMENTS

| 266616 | 4/1965 | Australia | 285/382.7 |
| 734307 | 5/1966 | Canada | 285/423 |
| 36719 | 2/1965 | German Democratic Rep. | 285/343 |
| 476249 | 9/1969 | Switzerland | 285/343 |
| 914094 | 12/1962 | United Kingdom | 285/249 |
| 1162344 | 8/1969 | United Kingdom | 285/343 |

Primary Examiner—Thomas F. Callaghan
Attorney, Agent, or Firm—Benjamin J. Barish

[57] ABSTRACT

A tube connection fitting comprises a body member formed with an annular recess for receiving the end of a tube to be connected, and a cap threaded onto the body member and including a plurality of fingers engaging the end of the tube received within the annular recess. The outer end of the annular recess is shaped in such a manner that it accomodates different sizes of tubes, and securely locks and seals the tube within the recess.

7 Claims, 3 Drawing Figures

TUBE CONNECTION FITTINGS

BACKGROUND OF THE INVENTION

The present invention relates to a connection fitting for effecting a connection to a tube, e.g. to connect the tube to one or more other tubes. The invention is particularly related to fittings for connecting small-diameter tubing (e.g., up to 16 mm) adapted to carry relatively low air or liquid pressure (e.g., from 2.5–4 atmospheres).

A large number of fittings are now in use for making tube connections. One common type includes a steel grab washer between the cap and body member of the fitting and effective, upon tightening the cap onto the body member, to bite into the tube and thereby to retain it within the fitting. Such a fitting, however, does not permit the ready removal of the tube should it be desired to detach it from the fitting. In addition, such fittings usually accommodate only one tube size and therefore require a separate fitting size for each size tube to be connected. Further, such fittings usually also require separate sealing means, such as gaskets or sealing rings, to prevent leakage of the fluid carried thereby.

It is also known to use a connection fitting including a cap threaded onto a body member, which cap is formed with a plurality of resilient fingers adapted to engage the end of the tube to securely clamp the tube within the body member. However, such known fittings also usually require separate sealing means; moreover, they usually also can accommodate only one size tube and therefore require a special size fitting for each size tube.

An object of the present invention is to provide a connection fitting having advantages in the foregoing respects. More particularly, an object of the present invention is to provide a connection fitting of few and simple parts which not only securely locks the tube within the fitting in such manner as to permit its ready removal should it be desired to detach it from the fitting, but which also effectively seals the tube within the fitting, and which also accommodates a range of different-sized tubes so that one fitting can be used for several different-sized tubes.

SUMMARY OF THE INVENTION

According to the present invention, there is provided a connection fitting for effecting a connection to a tube, comprising: a body member formed with an annular recess extending axially inwardly of one end of the body member to define an inner tubular portion and an outer sleeve portion integrally joined to the tubular portion at its inner end and spaced therefrom at its outer end for receiving an end of the tube to be connected thereby; and a cap threaded onto said body member and including an end wall formed with an opening circumscribed by a plurality of fingers adapted to engage the end of the tube received within said recess. Each of the fingers includes a flexible juncture to said cap and an axial extension extending inwardly in said space between the inner tubular portion and outer sleeve portion of the body member defined by said annular recess. The thickness and diameter of said annular recess throughout its complete length are at least as large as the thickness and diameter of the tube to be connected by the fitting. In addition, the outer end of the annular recess is shaped such that the outer face of said tubular portion is inwardly stepped, and the inner face of said sleeve portion is inwardly tapered from its outer edge, whereby said outer shaped end of the annular recess is effective, upon receiving the fingers of the threaded cap, to accommodate slightly different-sized tubes within said annular recess, to securely lock the tube within said recess, and to effectively seal the tube within said recess.

In the preferred embodiment of the invention described below, the tips of the fingers are tapered at their outer faces to complement the tapered inner face of the outer end of the sleeve portion of the body member.

Also in the preferred described embodiment, the tips of the fingers are inwardly stepped at their inner faces to complement the inwardly stepped face of the outer end of the tubular portion of the body member.

The foregoing features have been found to enhance the locking and sealing of the tube within the annular recess in such manner as to enable the fitting to accommodate a limited range of different-sized tubes.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 3:
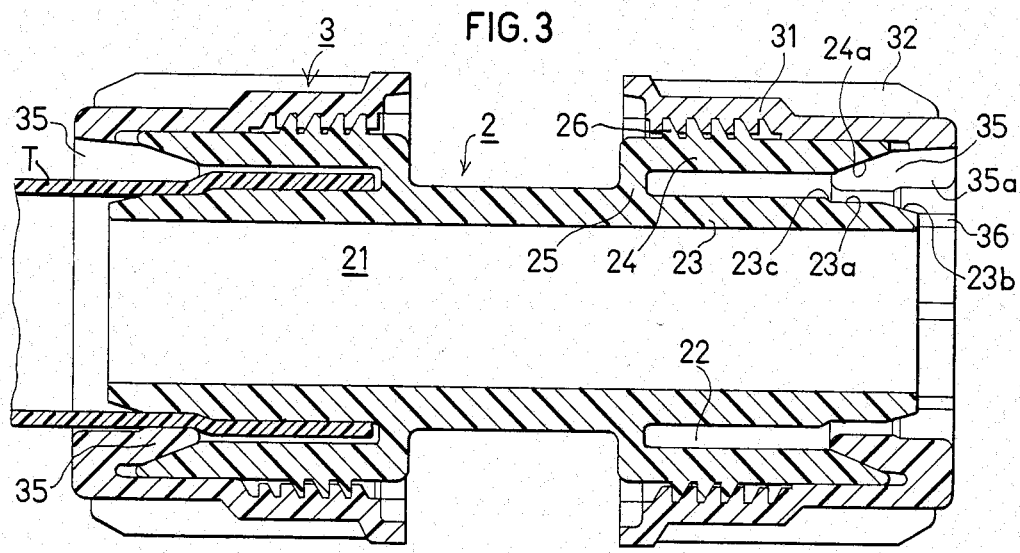
FIG. 3 is a sectional view illustrating the fitting of FIG. 1 in its assembled condition with a tube connected to one end.

The fitting illustrated in the drawings is an in-line connector for connecting two tubes together along a common axis. FIG. 3 illustrates one of these tubes, therein designated T, connected to one side of the fitting, it being understood that another tube (not shown) would be connected in the same manner at the other end of the fitting. The fitting illustrated in the drawings is particularly useful for small-diameter tubes, e.g., up to about 16 mm outer diameter, of either hard or soft material and adapted to carry pressures within the range of 2.5–4.0 atmospheres.

Figure 1:
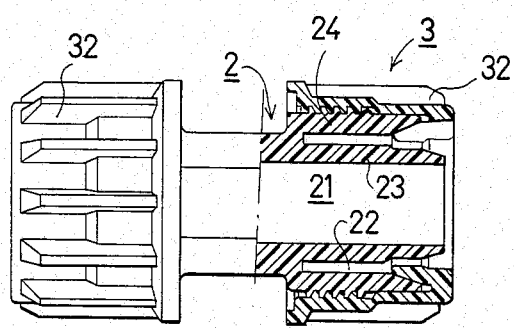
FIG. 1 illustrates one form of connection fitting constructed in accordance with the invention, one half of the fitting being shown in side elevation, and the other half being shown in longitudinal section.

The fitting illustrated in the drawings comprises two basic parts, namely, a body member generally designated 2, and a cap generally designated 3. In the illustrated in-line fitting wherein two tubes are to be connected in line, it will be appreciated that, as shown in FIGS. 1 and 3, the body member 2 is adapted to receive two tubes T in line, with a cap 3 applied to each end for securely locking each tube in its respective end of the body member. Since the two ends of the fitting are the same, only one end, as more particularly illustrated in FIG. 2, will be hereinafter described.

Thus, the body member 2 is formed with an axially-extending bore 21 providing a passageway therethrough for the fluid carried by the tubes connected to the fitting. Body member 2 is further formed with an annular recess 22 extending axially inwardly of each end of the body member to define, at each end, an inner tubular portion 23 and an outer sleeve portion 24 integrally joined to each other at their inner ends 25, but spaced from each other at their outer ends by the recess 22, for receiving an end of the tube (T) to be connected to the fitting.

Figure 2:
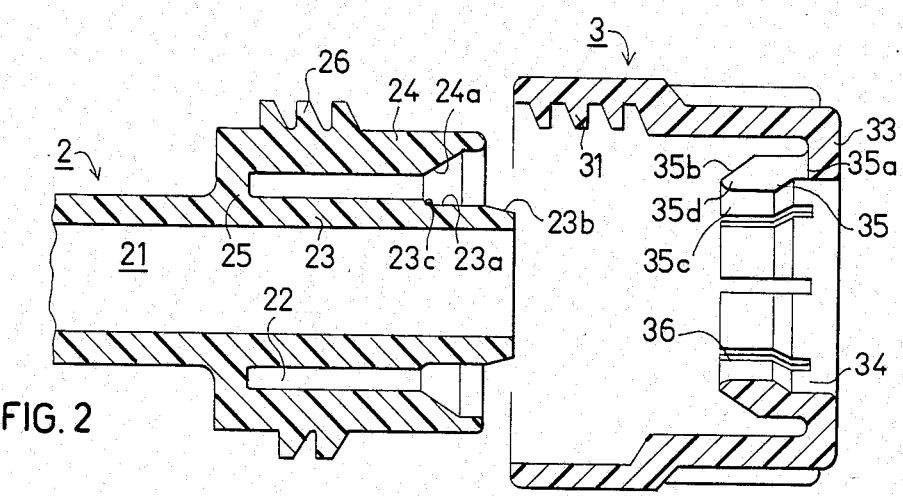
FIG. 2 is an enlarged exploded sectional view of one half of the fitting of FIG. 1, illustrating its two main parts.

Annular recess 22 is shaped at its outer end, as shown particularly in FIGS. 2 and 3, such that the outer face of the tubular portion is inwardly stepped, as shown at 23a, and the inner face of the sleeve portion 24 is inwardly tapered as shown at 24a; i.e., its diameter decreases from its outer edge in the inward direction. The outer edge of the tubular portion 23 is also inwardly tapered as shown at 23b (i.e., its diameter increases from the outer edge inwardly) until its juncture with the stepped portion 23a. The diameter of the stepped portion 23a is substantially constant for its complete length, until its juncture 23c with the remainder of the recess 22. The juncture 23c at the end of the stepped portion 23a is defined by a more sharply tapered annular surface substantially aligned with the end of the tapered surface 24a of the sleeve portion 24

The remainder of recess 22 between the outer face of the tubular portion 23 and the inner face of the sleeve portion 24 is of substantially uniform width. This width of the recess 22 should be sufficiently large so as to accommodate a limited range of tube sizes, both with respect to the inner diameter and the outer diameter of the tubes to be connected by the fitting.

The outer face of the body member 2 is formed with external threads, as shown at 26, which threads cooperate with internal threads 31 formed on the inner face of the cap 3. The cap 3 is further formed with a plurality of axially-extending, circumferentially-spaced ribs 32 to facilitate the manual rotation of the cap.

Cap 3 is further formed with an end wall 33 formed with a central opening 34 for receiving the tube (T) to be connected to the fitting. Opening 34 of the cap is circumscribed by a plurality of fingers 35, spaced by axially extending slits 36. Fingers 35 are adapted to engage the end of the connected tube which is received through opening 34 into recess 22 of the body member 2, and to securely clamp the tube to the body member.

As shown particularly in FIG. 2, each of the fingers 35 is formed with an axially-extending flexible juncture 35a to the cap end wall 33, which juncture permits the finger to flex radially inwardly into clamping engagement with the tube (T) as will be described more particularly below. In addition, the tip of each finger is inwardly tapered on its outer face, as shown at 35b, in a complementary manner to the tapered face 24a of the sleeve portion 24 of the body member 2. Further, the inner face of each finger 34 is inwardly stepped, as shown at 35c, in a complementary manner to the inwardly stepped face 23a of the tubular portion 23 of the body member 2, and the tip 35d joining the two faces 35b and 35c is rounded.

Preferably, the body member 2 and the cap 3 of the fitting are made of plastic material, such as polypropylene.

The tube T may be connected to each end of the illustrated fitting in the following manner.

First, the cap 3 is removed or loosened by threading from the respective end of the body member 2. The end of the tube T is then passed through the opening 34 of the cap into the recess 22 of the body member and is pushed to the end of the recess, such that the end of the tube engages the juncture portion 25 between the tubular portion 23 and sleeve portion 24 of the body member. Cap 3 is then threaded onto the external threads 31 of the body member with the fingers 35 of the cap being received in the open end of the recess 22 between the tapered face 24a of the body member sleeve portion 24, and the stepped face 23a of its tubular portion 23.

It will be seen that as the cap is tightened, the tapered faces 35b of fingers 35 engage the tapered surface 24a of the tubular portion 24 of the body member, flexing the fingers radially inwardly such that the lower faces 35c of the fingers firmly press the tube wall against the stepped face 23a of the tubular portion 23 of the body member. In this manner, the fingers 35 securely lock the tube within the recess 22. In addition, the engagement of the annular juncture wall 23c with the inner face of the tube effectively seals the interior of the tube against leakage. Further, the foregoing illustrated arrangement has been found to be capable of accommodating a limited range of different tube sizes, both with respect to the inner and outer diameters of the tube.

Thus, the illustrated fitting does not require separate sealing means for sealing the tube within the fitting. Moreover, it securely locks the tube within the fitting, and permits the tube to be released, when desired, in a simple manner by merely unthreading the cap. Further, since this arrangement can accommodate a range of tube sizes, it does not require a special size fitting for each tube.

While the invention has been described with respect to an in-line connector, it will be appreciated that it could be embodied in many other types of tube fittings, such as elbow connectors, T-connectors, adapters, and the like. Many other variations, modifications and applications of the invention may be made.

What is claimed is:

1. A connection fitting for effecting a connection to a tube, comprising:
   a body member formed with an annular recess extending axially inwardly of one end of the body member to define an inner tubular portion and an outer sleeve portion integrally joined to the tubular portion at its inner end and spaced therefrom at its outer end for receiving an end of the tube to be connected thereby;
   a cap threaded onto said body member and including an end wall formed with an opening circumscribed by a plurality of fingers adapted to engage the end of the tube received within said recess;
   each of said fingers including a flexible juncture to said cap and an axial extension extending inwardly in said space between the inner tubular portion and outer sleeve portion of the body member defined by said annular recess;
   the thickness and diameter of said annular recess throughout its length being at least as large as the thickness and diameter of the tube to be connected thereto;
   the outer end of said annular recess being shaped such that the outer face of said tubular portion of said body member is inwardly stepped, and the inner face of said sleeve portion being inwardly tapered from its outer edge, whereby said outer shaped end of the annular recess is effective, upon receiving the fingers of the threaded cap, to accommodate slightly different-sized tubes within said annular recess, to securely lock the tube within said recess, and to effectively seal the tube within said recess.

2. The fitting according to claim 1, wherein the tips of said fingers are tapered at their outer faces to complement the tapered inner face of the outer end of the sleeve portion of the body member.

3. The fitting according to claim 2, wherein the tips of said fingers are inwardly stepped at their inner faces to complement the inwardly stepped face of the outer end of the tubular portion of the body member.

4. The fitting according to claim 1, wherein the outer edge of said tubular portion is tapered with a diameter decreasing from the inwardly-stepped face of the body member tubular portion to its outer face.

5. The fitting according to claim 1, wherein the outer tip of each finger is rounded.

6. The fitting according to claim 1, wherein said fingers include axially-extending flexible junctures to said cap.

7. The fitting according to claim 1, wherein the outer face of said cap is formed with axially-extending, circumferentially-spaced ribs.

* * * * *